(12) United States Patent
Annan et al.

(10) Patent No.: US 9,100,769 B2
(45) Date of Patent: Aug. 4, 2015

(54) SYSTEM AND METHOD OF STORING SERVICE BRAND PACKAGES ON A MOBILE DEVICE

(71) Applicant: Sprint Communications Company L.P., Overland Park, KS (US)

(72) Inventors: Brandon C. Annan, Westwood Hills, KS (US); John E. Belser, Olathe, KS (US); Dale S. Schempp, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 186 days.

(21) Appl. No.: 13/763,428

(22) Filed: Feb. 8, 2013

(65) Prior Publication Data
US 2014/0228012 A1    Aug. 14, 2014

(51) Int. Cl.
*H04M 3/00* (2006.01)
*H04W 4/00* (2009.01)
(Continued)

(52) U.S. Cl.
CPC ............. *H04W 4/001* (2013.01); *H04M 15/70* (2013.01); *H04W 8/183* (2013.01); *H04W 8/205* (2013.01); *H04W 8/245* (2013.01); *H04W 8/265* (2013.01); *H04W 88/06* (2013.01)

(58) Field of Classification Search
CPC ..... H04W 4/001; H04W 88/06; H04W 8/245; H04W 8/183; H04W 8/205; H04W 8/265; H04M 15/745; H04M 15/70; H04M 2215/0108; H04M 3/42289
USPC ........ 455/418, 419, 434, 435.1, 435.2; 711/5, 711/100–104, 129, 150–154, 163–166
See application file for complete search history.

(56) References Cited

U.S. PATENT DOCUMENTS 7,165,191 B1   1/2007   Vakrat
7,266,371 B1   9/2007   Amin et al.
(Continued)

FOREIGN PATENT DOCUMENTS

WO    2012078753 A1    6/2012
WO    2013169983 A1    11/2013
(Continued)

OTHER PUBLICATIONS

First Action Interview Pre-Interview Communication dated Aug. 13, 2013, U.S. Appl. No. 13/335,941, filed Dec. 23, 2011.
(Continued)

*Primary Examiner* — Charles Appiah
*Assistant Examiner* — Jaime Holliday

(57) ABSTRACT

A method of providing wireless communication service to a mobile device is provided. The method comprises providing a system memory partition and a carrier memory partition on the mobile device. The method further comprising protecting two or more service brand packages from deletion by a mobile device reset. The method further comprises provisioning the mobile device with a first service brand network. The method further comprising resetting the mobile device, wherein resetting the mobile device comprises removing the mobile device from the first service brand network and deleting unprotected data stored on the mobile device. The method further comprising provisioning the mobile device with a second service brand network without re-installing previously installed data associated with the second service brand package.

20 Claims, 7 Drawing Sheets

(51) Int. Cl.
*H04W 8/26* (2009.01)
*H04M 15/00* (2006.01)
*H04W 8/18* (2009.01)
*H04W 88/06* (2009.01)
*H04W 8/24* (2009.01)
*H04W 8/20* (2009.01)

(56) References Cited

U.S. PATENT DOCUMENTS

| | | | |
|---|---|---|---|
| 7,493,111 | B2 | 2/2009 | Knowles |
| 7,817,988 | B2 | 10/2010 | Kruis et al. |
| 7,904,895 | B1 | 3/2011 | Cassapakis et al. |
| 8,107,926 | B2 | 1/2012 | Goto |
| 8,185,101 | B1 | 5/2012 | Wiseman et al. |
| 8,260,281 | B2 | 9/2012 | Urbanek |
| 8,401,538 | B2 | 3/2013 | Urbanek |
| 8,401,595 | B2 | 3/2013 | Zhu et al. |
| 8,433,953 | B1 | 4/2013 | Gaudette et al. |
| 8,571,536 | B2 | 10/2013 | Urbanek |
| 8,612,967 | B1 | 12/2013 | Delker |
| 8,626,165 | B1 | 1/2014 | Narasimhan et al. |
| 8,666,383 | B1 | 3/2014 | Mauer et al. |
| 8,825,039 | B2* | 9/2014 | Mizuguchi ............ 455/422.1 |
| 8,909,291 | B1 | 12/2014 | Spanel et al. |
| 2002/0091931 | A1 | 7/2002 | Quick, Jr. et al. |
| 2003/0217145 | A1 | 11/2003 | Leung et al. |
| 2004/0033798 | A1 | 2/2004 | Robin et al. |
| 2004/0092248 | A1 | 5/2004 | Kelkar et al. |
| 2004/0093109 | A1 | 5/2004 | O'Connor et al. |
| 2004/0116163 | A1* | 6/2004 | Kim et al. .............. 455/575.1 |
| 2004/0137890 | A1 | 7/2004 | Kalke |
| 2004/0137891 | A1* | 7/2004 | Clark et al. ................. 455/418 |
| 2005/0085222 | A1 | 4/2005 | Przybilski et al. |
| 2005/0119001 | A1 | 6/2005 | Watanabe |
| 2005/0188262 | A1 | 8/2005 | Rosenman et al. |
| 2005/0197098 | A1 | 9/2005 | Trossen |
| 2006/0025151 | A1 | 2/2006 | Karaoguz et al. |
| 2006/0135144 | A1* | 6/2006 | Jothipragasam ........... 455/419 |
| 2006/0154651 | A1 | 7/2006 | Knowles |
| 2006/0203722 | A1 | 9/2006 | Oommen |
| 2006/0208071 | A1 | 9/2006 | Chang et al. |
| 2006/0235944 | A1 | 10/2006 | Haslam |
| 2006/0236325 | A1 | 10/2006 | Rao et al. |
| 2006/0246949 | A1 | 11/2006 | Gupta et al. |
| 2007/0004404 | A1 | 1/2007 | Buckley et al. |
| 2007/0082655 | A1 | 4/2007 | Link et al. |
| 2007/0099599 | A1 | 5/2007 | Smith et al. |
| 2007/0129057 | A1 | 6/2007 | Xu et al. |
| 2007/0130156 | A1 | 6/2007 | Tenhunen et al. |
| 2007/0165654 | A1 | 7/2007 | Chai et al. |
| 2007/0169084 | A1 | 7/2007 | Frank et al. |
| 2007/0190939 | A1 | 8/2007 | Abel |
| 2007/0197234 | A1 | 8/2007 | Gill et al. |
| 2007/0250645 | A1 | 10/2007 | Meadows et al. |
| 2007/0254635 | A1 | 11/2007 | Montelius |
| 2008/0039114 | A1 | 2/2008 | Phatak et al. |
| 2008/0046583 | A1 | 2/2008 | Rao |
| 2008/0046880 | A1 | 2/2008 | Jun et al. |
| 2008/0046997 | A1* | 2/2008 | Wang ............................ 726/16 |
| 2008/0062900 | A1 | 3/2008 | Rao |
| 2008/0065753 | A1 | 3/2008 | Rao |
| 2008/0109662 | A1* | 5/2008 | Natarajan et al. ............ 713/193 |
| 2008/0146280 | A1 | 6/2008 | Sasse et al. |
| 2008/0167027 | A1 | 7/2008 | Gautier et al. |
| 2008/0171532 | A1 | 7/2008 | Shieh et al. |
| 2008/0225806 | A1 | 9/2008 | Arian et al. |
| 2008/0281511 | A1 | 11/2008 | Miyata |
| 2008/0318547 | A1 | 12/2008 | Ballou, Jr. et al. |
| 2009/0061840 | A1 | 3/2009 | Fleischman et al. |
| 2009/0093242 | A1 | 4/2009 | Bhalekar et al. |
| 2009/0094350 | A1 | 4/2009 | Rive et al. |
| 2009/0106200 | A1 | 4/2009 | Salinas et al. |
| 2009/0124250 | A1 | 5/2009 | Topaltzas et al. |
| 2009/0156209 | A1 | 6/2009 | Franklin et al. |
| 2009/0239518 | A1 | 9/2009 | Feuillette |
| 2009/0247124 | A1 | 10/2009 | de Atley et al. |
| 2009/0260004 | A1 | 10/2009 | Datta et al. |
| 2009/0307763 | A1 | 12/2009 | Rawlins et al. |
| 2010/0048193 | A1 | 2/2010 | Ortion et al. |
| 2010/0060456 | A1 | 3/2010 | Forster |
| 2010/0075669 | A1 | 3/2010 | Sparks et al. |
| 2010/0080143 | A1 | 4/2010 | Topaltzas et al. |
| 2010/0133335 | A1 | 6/2010 | Maguid et al. |
| 2010/0136960 | A1 | 6/2010 | Knezevic |
| 2010/0159876 | A1* | 6/2010 | Brown et al. ................. 455/410 |
| 2010/0161724 | A1 | 6/2010 | Sathyan et al. |
| 2010/0167696 | A1 | 7/2010 | Smith et al. |
| 2010/0192120 | A1 | 7/2010 | Raleigh |
| 2010/0203864 | A1 | 8/2010 | Howard |
| 2010/0207742 | A1 | 8/2010 | Buhot et al. |
| 2010/0222047 | A1 | 9/2010 | Vanderlinden et al. |
| 2010/0262638 | A1 | 10/2010 | Fitzgerald |
| 2010/0291898 | A1 | 11/2010 | Sanding et al. |
| 2010/0311404 | A1 | 12/2010 | Shi et al. |
| 2010/0312794 | A1 | 12/2010 | Liu |
| 2010/0325622 | A1 | 12/2010 | Morton |
| 2010/0332639 | A1 | 12/2010 | Diaz et al. |
| 2011/0003590 | A1* | 1/2011 | Yoon et al. .................. 455/432.1 |
| 2011/0014913 | A1 | 1/2011 | Yoon et al. |
| 2011/0026501 | A1 | 2/2011 | Sharaga et al. |
| 2011/0028138 | A1 | 2/2011 | Davies-Moore et al. |
| 2011/0030062 | A1 | 2/2011 | Hsu et al. |
| 2011/0035421 | A1 | 2/2011 | Laird-McConnell et al. |
| 2011/0081885 | A1 | 4/2011 | Sennett et al. |
| 2011/0119716 | A1 | 5/2011 | Coleman, Sr. |
| 2011/0138074 | A1 | 6/2011 | Onda et al. |
| 2011/0161659 | A1 | 6/2011 | Himawan et al. |
| 2011/0165836 | A1 | 7/2011 | Dixon et al. |
| 2011/0208338 | A1 | 8/2011 | Eteminan et al. |
| 2011/0222404 | A1 | 9/2011 | Watson et al. |
| 2011/0230136 | A1 | 9/2011 | Washiro |
| 2011/0258249 | A1 | 10/2011 | Biggs et al. |
| 2011/0263294 | A1 | 10/2011 | Kim et al. |
| 2011/0296399 | A1 | 12/2011 | Tugnawat et al. |
| 2011/0306318 | A1* | 12/2011 | Rodgers et al. ............... 455/410 |
| 2011/0314129 | A1 | 12/2011 | Rezaiifar et al. |
| 2012/0027059 | A1 | 2/2012 | Zhao et al. |
| 2012/0036282 | A1 | 2/2012 | Chen et al. |
| 2012/0046022 | A1 | 2/2012 | Kalke et al. |
| 2012/0047227 | A1 | 2/2012 | Haggerty et al. |
| 2012/0094684 | A1 | 4/2012 | Reddy |
| 2012/0106509 | A1 | 5/2012 | Klingenbrunn et al. |
| 2012/0129513 | A1 | 5/2012 | van der Laak |
| 2012/0129572 | A1 | 5/2012 | Johnstone et al. |
| 2012/0135733 | A1 | 5/2012 | Cormier et al. |
| 2012/0158580 | A1 | 6/2012 | Eram et al. |
| 2012/0203824 | A1 | 8/2012 | Oommen |
| 2012/0208511 | A1 | 8/2012 | Vanderlinden et al. |
| 2012/0230587 | A1 | 9/2012 | Arseneau |
| 2012/0260095 | A1 | 10/2012 | Von Hauck et al. |
| 2012/0276872 | A1 | 11/2012 | Knauth et al. |
| 2012/0282891 | A1 | 11/2012 | Mohammed et al. |
| 2012/0282924 | A1 | 11/2012 | Tagg et al. |
| 2013/0023235 | A1 | 1/2013 | Fan et al. |
| 2013/0031191 | A1 | 1/2013 | Bott |
| 2013/0031234 | A1 | 1/2013 | Alfano et al. |
| 2013/0046951 | A1 | 2/2013 | Jones |
| 2013/0065578 | A1 | 3/2013 | Raleigh et al. |
| 2013/0072168 | A1 | 3/2013 | Colucciello et al. |
| 2013/0085914 | A1 | 4/2013 | McPherson et al. |
| 2013/0111461 | A1 | 5/2013 | Zubas et al. |
| 2013/0137417 | A1 | 5/2013 | Urbanek |
| 2013/0198567 | A1 | 8/2013 | Ahmed et al. |
| 2013/0303142 | A1 | 11/2013 | Burcham et al. |
| 2013/0310003 | A1 | 11/2013 | Sadhvani et al. |
| 2013/0311836 | A1 | 11/2013 | Hurst et al. |
| 2014/0045483 | A1 | 2/2014 | Whidden |
| 2014/0080467 | A1 | 3/2014 | Urbanek |
| 2014/0113610 | A1 | 4/2014 | Satish et al. |
| 2014/0206313 | A1 | 7/2014 | Spanel et al. |
| 2014/0228042 | A1 | 8/2014 | Annan et al. |

(56) References Cited

U.S. PATENT DOCUMENTS

| | | |
|---|---|---|
| 2014/0274032 A1 | 9/2014 | Shipley et al. |
| 2014/0373184 A1 | 12/2014 | Mahaffey et al. |
| 2015/0065105 A1 | 3/2015 | Masterson et al. |

FOREIGN PATENT DOCUMENTS

| | | |
|---|---|---|
| WO | 2014046814 A1 | 3/2014 |
| WO | WO2014113128 A1 | 7/2014 |
| WO | WO2014123758 A1 | 8/2014 |
| WO | WO2014123759 A1 | 8/2014 |
| WO | WO2014158430 A1 | 9/2014 |
| WO | WO2015030945 A1 | 3/2015 |

OTHER PUBLICATIONS

First Action Interview Pre-Interview Communication dated Sep. 22, 2014, U.S. Appl. No. 13/468,028, filed May 9, 2013.
Final Office Action dated Sep. 19, 2014, U.S. Appl. No. 13/622,234, filed on Sep. 18, 2012.
FAIPP Pre-Interview Communication dated Mar. 19, 2014, U.S. Appl. No. 13/744,847, filed on Jan. 18, 2013.
Notice of Allowance dated Aug. 4, 2014, U.S. Appl. No. 13/744,847, filed on Jan. 18, 2013.
FAIPP Pre-Interview Communication dated Jul. 16, 2014, U.S. Appl. No. 13/744,861, filed on Jan. 18, 2013.
Final Office Action dated Aug. 19, 2014, U.S. Appl. No. 13/763,434, filed on Feb. 8, 2013.
Office Action dated Aug. 7, 2014, U.S. Appl. No. 13/831,504, filed on Mar. 14, 2013.
Foreign Communication From a Related Counterpart Application, International Search Report and Written Opinion dated Jan. 24, 2014, International Application No. PCT/US13/68981 filed on Nov. 7, 2013.
Spanel, Robert L., et al., Patent Application entitled "Dynamic Remotely Managed SIM Profile" U.S. Appl. No. 13/744,847, filed on Jan. 18, 2013.
Urbanek, Robert E., "Delivery of Branding Content and Customizations to a Mobile Communication Device", filed Oct. 23, 2013, U.S. Appl. No. 14/060,712.
Urbanek, Robert E., "Delivery of Branding Content and Customizations to a Mobile Communication Device", filed , 201, International Serial No. PCT/US14/56778.
Urbanek, Robert E., "Implementation of Remotely Hosted Branding Content and Customizations", filed Oct. 23, 2013, U.S. Appl. No. 14/085,474.
Urbanek, Robert E., "Subscriber Identity Module Virtualization", filed Nov. 20, 2013, U.S. Appl. No. 14/060,719.
Indurkar, Dhananjay, "System and Method of Branding a Device Independent of Device Activation", filed Jan. 24, 2014, U.S. Appl. No. 14/163,035.
Sumner, Bret D., "Directing Server Connection Based on Location Identifier", filed Aug. 15, 2013, U.S. Appl. No. 13/968,259.
Abou-El-Ella, Hassan, et al., "Segmented Customization Payload Delivery", filed Aug. 27, 2013, U.S. Appl. No. 14/010,518.
Sumner, Bret D., "Segmented Customization Package Within Distributed Server Architecture", filed Aug. 27, 2013, U.S. Appl. No. 14/010,522.
Masterson, Michelle E., et al., "Development and Testing of Payload Receipt by a Portable Electronic Device", filed Aug. 27, 2013, U.S. Appl. No. 14/010,523.
Masterson, Michelle E., et al., "System and Methods for Deferred and Remote Device Branding", filed Aug. 27, 2013, U.S. Appl. No. 14/010,524.
Masterson, Michelle E., et al., "System and Methods for Deferred and Remote Device Branding", filed Jul. 16, 2014, International Serial No. PCT/US14/46773.
Callan, Jeffery S., et al., "Delivery of Oversized Branding Elements for Customization", filed Nov. 6, 2013, U.S. Appl. No. 14/073,321.
Indurkar, Dhananjay, "Background Delivery of Device Configuration and Branding", filed Jan. 16, 2014, U.S. Appl. No. 14/157,507.
Ahn, Chul Jin, et al., "Separation of Client Identification Composition from Customization Payload to Original Equipment Manufacturer Layer", filed Nov. 8, 2013, U.S. Appl. No. 14/075,687.
Ghoshal, Jagannath, et al., "Multiple Carrier Partition Dynamic Access on a Mobile Device", filed Jun. 5, 2014, U.S. Appl. No. 14/297,429.
Indurkar, Dhananjay, "Activation Sequence Using Permission Based Connection to Network", filed Jan. 24, 2014, U.S. Appl. No. 14/163,041.
Ahn, Chul Jin, et al., "Customization for Preloaded Applications", filed Mar. 31, 2014, U.S. Appl. No. 14/231,718.
Foreign Communication from a Related Counterpart—International Search Report and Written Opinion, dated Jun. 3, 2014,PCT/US14/16650, filed on Feb. 16, 2014 [29701].
Foreign Communication from a Related Counterpart Application, "Preliminary Report on Patentability", dated Jun. 20, 2013, PCT/US2011/063736 filed on Dec. 7, 2011 [06801].
Foreign Communication from a Related Counterpart—International Search Report and Written Opinion, dated Jul. 24, 2013, PCT/US13/40278, filed on May 9, 2013 [15901].
Notice of Allowance dated Jun. 21, 2013, U.S. Appl. No. 13/752,386, filed Jan. 28, 2013.
Notice of Allowance dated Aug. 9, 2013, U.S. Appl. No. 13/149,505, filed May 31, 2013.
Notice of Allowance dated Oct. 9, 2013, U.S. Appl. No. 13/335,941, filed Dec. 23, 2011.
Delker, Jason R., "Loading Branded Media Outside System Partition", filed Oct. 30, 2013 U.S. Appl. No. 14/066,947.
Foreign Communication from a Related Counterpart—International Search Report and Written Opinion, dated Nov. 14, 2013, PCT/US13/55023, filed on Aug. 15, 2013 [16801].
Mauer, Brian D., et al., "Automatic Branding of Generic Applications", filed Jan. 10, 2013, U.S. Appl. No. 14/152,627.
Urbanek, Robert E., "Generic Mobile Devices Customization Framework", filed Aug. 15, 2013, International Serial No. PCT/US13/55023.
Annan, Brandon C., et al.,"System and Method of Storing Service Brand Packages on a Mobile Device", filed Jan. 30, 2014, International Serial No. PCT/US14/13936.
Annan, Brandon C., et al.,"System and Method of Provisioning and Reprovisioning a Mobile Device Based on Self-locating", filed filed Jan. 30, 2014, International Serial No. PCT/US14/13939.
Foreign Communication from a Related Counterpart—International Search Report and Written Opinion, dated May 19, 2014, PCT/US14/13936, filed on Jan. 30, 2014 [28701].
Foreign Communication from a Related Counterpart—International Search Report and Written Opinion, dated May 14, 2014, PCT/US14/13939, filed on Jan. 30, 2014 [28801].
First Action Interview Pre-Interview Communication dated Apr. 23, 2014, U.S. Appl. No. 13/622,234, filed Sep. 18, 2012.
First Action Interview Pre-Interview Communication dated Apr. 3, 2014, U.S. Appl. No. 13/763,434, filed Feb. 8, 2013.
Foreign Communication from a Related Counterpart—International Search Report and Written Opinion, PCT/US2011/063736.
Notice of Allowance dated Apr. 26, 2012, U.S. Appl. No. 12/962,620, filed Dec. 7, 2010.
Notice of Allowance dated Nov. 2, 2012, U.S. Appl. No. 13/556,202, filed Jul. 24, 2012.
First Action Interview Pre-Interview Communication dated Feb. 25, 2013, U.S. Appl. No. 13/149,505, filed May 31, 2013.
First Action Interview Office Action dated May 8, 2013, U.S. Appl. No. 13/149,505, filed May 31, 2013.
Urbanek, Robert E., "System and Method of Wireless Communication", filed Dec. 7, 2010, U.S. Appl. No. 12/962,620.
Urbanek, Robert E., "System and Method for Generic Mobile Phone Configuration", filed Jul. 24, 2012, U.S. Appl. No. 13/556,202.
Urbanek, Robert E., "System and Method for Generic Mobile Phone Configuration", filed Jan. 28, 2013, U.S. Appl. No. 13/752,386.
Delker, Jason R., "Loading Branded Media Outside System Partition", filed May 31, 2011 U.S. Appl. No. 13/149,505.
Burcham, Robert H., et al.,"Self-Identification of Brand and Branded Firmware Installation in a Generic Electronic Device", filed May 9, 2012 U.S. Appl. No. 13/468,028.

(56) References Cited

OTHER PUBLICATIONS

Mauer, Brian D., et al., "Automatic Branding of Generic Applications", filed Dec. 23, 2011 U.S. Appl. No. 13/335,941.
Urbanek, Robert E., "Generic Mobile Devices Customization Framework", filed Sep. 18, 2012, U.S. Appl. No. 13/622,234.
Annan, Brandon C., et al.,"System and Method of Branding and Labeling a Mobile Device", filed Mar. 15, 2013, U.S. Appl. No. 13/844,104.
Annan, Brandon C., et al.,"System and Method of Provisioning and Reprovisioning a Mobile Device Based on Self-locating", filed Feb. 8, 2013, U.S. Appl. No. 13/763,434.
Annan, Brandon C., et al.,"Electronic Fixed Brand Labeling", filed Feb. 8, 2013, U.S. Appl. No. 13/763,443.
Ghoshal, Jagannath, et al.,"Rebranding a Portable Electronic Device While Maintaining User Data", filed May 22, 2013, U.S. Appl. No. 13/899,567.
Ghoshal, Jagannath, et al.,"System and Method for Retrofitting a Branding Framework into a Mobile Communication Device", filed May 21, 2013, U.S. Appl. No. 13/899,566.
Advisory Action dated Dec. 17, 2014, U.S. Appl. No. 13/622,234, filed Sep. 18, 2012.
Notice of Allowance dated Nov. 22, 2014, U.S. Appl. No. 13/744,861, filed Jan. 18, 2013.
Notice of Allowance dated Dec. 29, 2014, U.S. Appl. No. 13/831,504, filed Mar. 14, 2013.
First Action Interview Pre-Interview Communication dated Nov. 20, 2014, filed on May 21, 2013.
Foreign Communication from a Related Counterpart Application, "Preliminary Report on Patentability," dated Nov. 20, 2014, PCT/US13/40278 filed on May 9, 2013 [15901].
Foreign Communication from a Related Counterpart—International Search Report and Written Opinion, dated Dec. 17, 2014, PCT/US14/46773, filed on Jul. 16, 2014 [36501].
Foreign Communication from a Related Counterpart—International Search Report and Written Opinion, dated Dec. 30, 2014, PCT/US14/56778, filed Sep. 22, 2014, [35501].
Spanel, Robert L., et al., Patent Application entitled "Dynamic Remotely Managed SIM Profile" U.S. Appl. No. 14/522,586 filed on Oct. 24, 2014.
Urbanek, Robert E., "Delivery of Branding Content and Customizations to a Mobile Communication Device", filed Sep. 22, 2014, International Serial No. PCT/US14/56778.
Koller, Gary D., et al., "Out of the Box Experience (OOBE) Country Choice Using Wi-Fi Layer Transmission," filed Oct. 31, 2014, U.S. Appl. No. 14/530,666.
Blinn, Benjamin P., et al. "System and Method of Efficient Mobile Device Network Brand Customization," filed Sep. 2, 2014, U.S. Appl. No. 14/475,399.
First Action Interview Office Action dated Mar. 16, 2015, U.S. Appl. No. 13/468,028, filed May 9, 2013.
Office Action dated Mar. 2, 2015, U.S. Appl. No. 13/622,234, filed on Sep. 18, 2012.
FAIPP Pre-Interview Communication dated Mar. 26, 2015, U.S. Appl. No. 14/522,586 filed on Oct. 24, 2014.
FAIPP Pre-Interview Communication dated Apr. 8, 2015, U.S. Appl. No. 13/844,104, filed Mar. 15, 2013.
Notice of Allowance dated Mar. 26, 2015,n U.S. Appl. No. 13/763,434, filed on Feb. 8, 2013.
Notice of Allowance dated Jan. 22, 2015, U.S. Appl. No. 13/899,566, filed on May 21, 2013.
FAIPP Pre-Interview Communication dated Apr. 15, 2015, U.S. Appl. No. 14/060,712, filed on Nov. 20, 2013.
FAIPP Pre-Interview Communication dated Mar. 4, 2015, U.S. Appl. No. 14/010,518, filed on Aug. 27, 2013.
FAIPP Pre-Interview Communication dated Apr. 1, 2015, U.S. Appl. No. 14/010,522, filed on Aug. 27, 2013.
FAIPP Pre-Interview Communication dated Apr. 3, 2015, U.S. Appl. No. 14/010,523, filed on Aug. 27, 2013.
FAIPP Pre-Interview Communication dated Mar. 10, 2015, U.S. Appl. No. 14/010,524, filed on Aug. 27, 2013.
FAIPP Pre-Interview Communication dated Apr. 8, 2015, U.S. Appl. No. 14/157,507, filed on Jan. 16, 2014.
Foreign Communication from a Related Counterpart—International Preliminary Report on Patentability, dated Apr. 2, 2015, PCT/US13/55023, filed on Aug. 15, 2013 [16801].
Delker, Jason R., et al. "Subscriber Identity Module (SIM) Card Initiation of Custom Application Launcher Installation on a Mobile Communication Device," filed Mar. 4, 2015, U.S. Appl. No. 14/639,056.
Delker, Jason R., et al. "Network Access Tiered Based on Application Launcher Installation," filed Mar. 4, 2015, U.S. Appl. No. 14/639,060.
FAIPP Pre-Interview Communication dated Mar. 12, 2015, U.S. Appl. No. 13/972,827, filed on Aug. 21, 2013.

* cited by examiner

SYSTEM AND METHOD OF STORING SERVICE BRAND PACKAGES ON A MOBILE DEVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile telephones are electronic devices used for mobile voice or data communication based on network connectivity provided by base stations known as cell towers or sites. Electronic devices may have a system memory partition which stores an operating system package and fundamental communication applications for operating the electronic device. The operating system protects the system partition by restricting read/write access. Electronic devices may also have a user memory partition which provides storage for vendor packages and data packages downloaded by an electronic device user. The operating system may permit read/write access to virtually anyone desiring to access the user memory partition.

SUMMARY

In an embodiment, a method of branding a mobile device is disclosed. The method comprises providing a system memory partition and a carrier memory partition on the mobile device, wherein the carrier memory partition is a partitioned segment of a mobile device operating system with a set of carrier memory partition rules comprising immunity from deletion of data stored on the carrier memory partition during a mobile device reset. The method further comprises protecting two or more service brand packages from deletion by a mobile device reset, wherein service brand packages are employed by service brands and wherein service brand packages are configured to provision the mobile device with service brand networks, and wherein protecting two or more service brand packages comprises storing the two or more service brand packages on the carrier memory partition. The method further comprises provisioning the mobile device with a first service brand network, wherein provisioning the mobile device with the first service brand network comprises activating the first service brand package and receiving mobile service on the mobile device using the first service brand network. The method further resetting the mobile device, wherein resetting the mobile device comprises removing the mobile device from the first service brand network and deleting unprotected data stored on the mobile device. The method further comprises provisioning the mobile device with a second service brand network without re-installing previously installed data associated with the second service brand package, wherein provisioning the mobile device with the second service brand network comprises activating the second service brand package and receiving mobile service on the mobile device using the second service brand network.

In an embodiment, a method of branding a mobile device is disclosed. The method comprises providing a system memory partition and a carrier memory partition on the mobile device, wherein the carrier memory partition is a partitioned segment of a mobile device operating system with a set of carrier memory partition rules comprising immunity from deletion of data stored on the carrier memory partition during a mobile device reset. The method further comprising storing one or more applications on the carrier memory partition, wherein applications are configured to execute one or more functions on the mobile device, and wherein storing one or more applications comprise protecting one or more applications from deletion during a mobile device reset. The method further comprises installing one or more applications updates on the carrier memory partition without accessing the system memory partition. The method further comprises resetting the mobile device, wherein resetting the mobile device comprises deleting unprotected data stored on the mobile device. The method further comprises executing one or more applications stored on the carrier partition without re-installing application updates previously installed with the one or more applications on the carrier partition.

In an embodiment, a mobile device apparatus is disclosed. The apparatus comprises a radio transceiver. The apparatus further comprises at least one processor. The apparatus further comprises a mobile device operating system. The apparatus further comprises a carrier partition comprising a set of carrier partition rules, wherein the carrier partition rules comprise providing control over access to the carrier partition to the service brands with service brand packages stored on the carrier partition and protecting at least a first service brand package and a second service brand package stored on the carrier partition during a reset of the mobile device. The apparatus further comprises a system partition comprising a set of system partition rules, wherein the system partition rules comprises providing control over access to the system partition to the manufacturer of the mobile device and protecting data stored on the system partition during a reset of the mobile device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
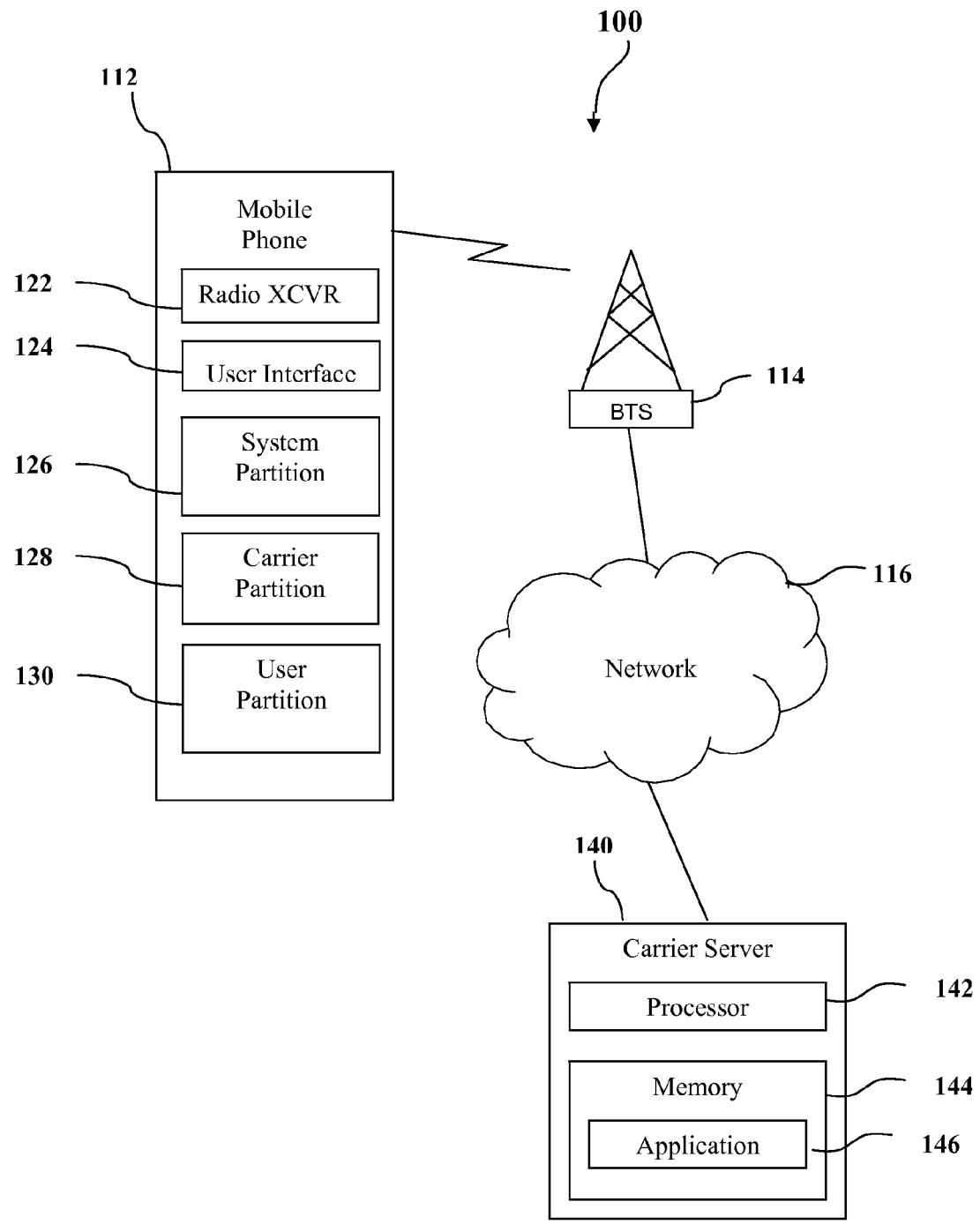
FIG. 1 is a block diagram of a provisioning system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

An apparatus and methods for branding and rebranding a mobile device with two or more service brand networks is described. Unique service brand packages for the same mobile device lead to separate stock keeping units (SKUs) for the same mobile device configured for different service brand networks, introducing complexity to inventory management and distribution. A single unique service brand package stored on a mobile device may limit or stop mobile communication service when the mobile device no longer has access or is no longer in range of the service brand network the device was provisioned with. Furthermore, a service brand package may be stored with the mobile device's operating system package so that in order for a service brand to update their service brand package the service brand must coordinate with a manufacturer's update.

As a remedy, a carrier partition is created on the mobile device. The carrier partition has rules (i.e. carrier partition rules) enforced by the operating system protecting data from deletion during a reset of the mobile device and giving certain parties control over read/write access. A reset of a mobile device may generally remove a mobile device from a mobile service network (i.e. so that the mobile device is not provisioned with a mobile service network) as well as delete unprotected data installed on the mobile device (e.g. music installed by a user on a user partition of the mobile device). A system partition may also be created on the mobile device. Generally, the system partition may store a mobile device operating system package and fundamental communication applications configured to provide functionality to the mobile device. The system partition may protect the mobile device's operating system package so that when a reset of the mobile device is implemented, the operating system package is not deleted from the mobile device. Read/write access to the system partition may be controlled by the operating system so that the manufacturer of the mobile device may have exclusive read/write access to the system partition, for example by providing access keys or tokens known only to the manufacturer. Additionally, a user partition may also be created on the mobile device. Generally, the user partition may store vendor data and/or data uploaded to the mobile device by a user. The rules of the user partition may also be controlled by the operating system. In an embodiment, the operating system may provide read/write access to the user partition to virtually anyone.

The carrier partition may generally store at least one service brand package configured to provision the mobile device with a service brand network. The carrier partition may protect service brand packages so that when a reset of the mobile device is implemented, the service brand packages are not deleted from the mobile device. This feature may allow the mobile device to change from operating on a first service brand network to operating on a second service brand network without reinstalling the second service brand package. Thus, a mobile device operating on a first service brand network may lose service when their mobile device is moved out of range from a first service brand network, but then may regain service when their mobile device comes into range of a second service brand network. For example, a mobile device may be located in the United States with a United States service brand network. The user of the mobile device may decide to leave the United States and the United States service brand network for Japan with a Japanese service brand network. The carrier partition of the mobile device may store both a United States service brand package associated with the United States service brand network and a Japanese service brand package associated with a Japanese service brand network so that when the mobile device moves from the United States to Japan, the mobile device may continue to receive mobile service. Additionally, this feature may allow the manufacturer of the mobile device as well as multi-service brand retailers to utilize economies of scale and reduce inventory costs by providing one mobile device associated with a single SKU configured for operation on two or more service brand networks. Furthermore, this feature may allow for updates to the service brand packages as well as vendor package updates stored on the carrier partition to be protected when the mobile device changes from operating on the first service brand network to operating on the second service brand network.

Access to the carrier partition is controlled by one or more carriers so that if updates to the first service brand package and/or the second service brand package are desired, only the carrier may access, provide access, and grant access to the carrier partition to make those updates. This feature may provide the carriers freedom to access to their service brand packages whenever they desire without having to coordinate for example with either another service brand or the mobile device manufacturer. Additionally, this feature may allow carriers to update their service brand packages even though the mobile device is operating on another service brand network. Furthermore, this feature may provide control to a carrier to permit only select vendors to install selected vendor packages or update selected vendor packages on the carrier partition.

Turning now to FIG. 1, a communication system 100 is described. The system 100 comprises a mobile device 112, a base transceiver station (BTS) 114, a network 116, and a server 140. The mobile device 112 may be a mobile phone, a personal digital assistant (PDA), a media player, or other communication enabled portable electronic device. In an embodiment, the mobile device 112 may be implemented as a handset. Details of handsets are discussed further hereinafter. The base transceiver station 114 provides a wireless communication link to the mobile device 112 and couples the mobile device 112 to the network 116. In an embodiment, the base transceiver station 114 provides a wireless communication link to the mobile device 112 according to one or more of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another wireless protocol. While a single base transceiver station 114 is illustrated in FIG. 1, it is understood that the communication system 100 may comprise any number of base transceiver stations 114 and any number of mobile devices 112. The network 116 may be a public communication network, a private communication network, or a combination thereof.

The mobile device 112 may comprise a radio transceiver 122, a first user interface 124, a system partition 126, a user partition 130, and a carrier partition 128. Alternatively, the mobile device 112 may comprise two or more radio transceivers 122. The system partition 126 may store at least an operating system package and the carrier partition 128 may store one or more service brand packages. The carrier server 140 may comprise a processor 142, a memory 144, and an application 146 stored in the memory 144. The carrier server 140 may be implemented as a computer system. Computers are discussed in more detail hereinafter.

The application 146, when executed by a processor 142 of the carrier server 140, may receive an activation message from the mobile device 112, the mobile device 112 having two or more service brand packages stored on the carrier partition 128, wherein one of the service brand packages is configured to provision the mobile device with the service brand network associated with the carrier server 140. In response to an activation message from the mobile device 112, the application 146 identifies the particular service brand package stored on the carrier partition of the mobile device 112 associated with the carrier server 140, and writes a reference over-the-air to enable the particular service brand package on the carrier partition to provision the mobile device 112 with the particular service brand network.

The carrier server 140 may also reside in a distribution center or warehouse, and that some or all initial provisioning events may be completed in the distribution center. This would allow branding and customization to be accomplished prior to sending a plurality of mobile devices 112 to a retail point of sale or a large enterprise customer, whom all want to sell and/or use the mobile device on a particular service brand network, for example.

Figure 2:
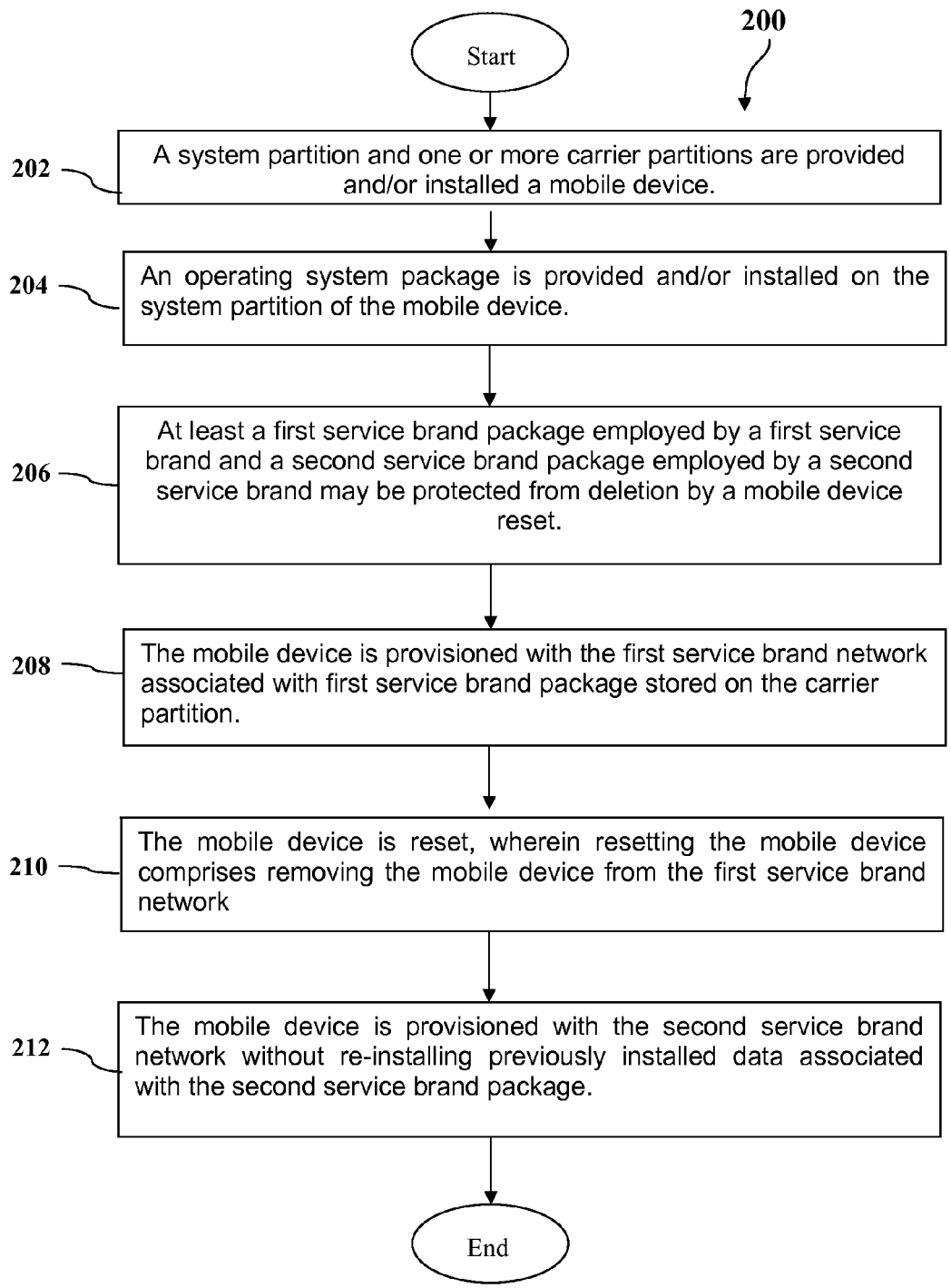
FIG. 2 is a flow chart of a method according to an embodiment of the disclosure.

In FIG. 2, a method 200 is described. At block 202, a system partition may be provided, for example, by the manufacturer of a mobile device. The system partition may comprise a set of system partition rules. In an embodiment, the system partition rules may comprise requirements for accessing the system partition. For example, access to the system partition may be controlled only by the manufacturer of the mobile device and thus access to the system partition requires permission from the manufacturer of the mobile device. In an embodiment, the system partition rules may comprise protecting data stored on the system partition. For example, protecting data stored on the system partition may comprise protecting data from deletion during a reset of the mobile device to factory settings. Additionally, in an embodiment, the system partition rules may comprise regulation of the size (i.e. the memory capacity) of the system partition. For example, the size of the system partition may be a fixed size, such as a size predetermined by the manufacturer. Conversely, the size of the system partition may be varied depending on the total available memory space on the mobile device.

Additionally at block 202, one or more carrier partitions may be provided and/or installed on the mobile device, for example by the manufacturer of a mobile device. In an embodiment, the carrier partition may be a memory partition which is distinct from the system partition and/or any other memory partition on the mobile device (e.g. a user partition). For example, the carrier partition may be physically distinct from the system partition and/or any other partition such that a physical barrier physically separates the partitions. Alternatively, the operating system may virtually separate the partitions by restricting access to the different partitions, for example, based on user ID and/or secure passwords or keys.

The carrier partition may also comprise a set of carrier partition rules. In an embodiment, the carrier partition rules may comprise requirements for accessing the carrier partition. For example, access to the carrier partition may be controlled by service brands which store their service brand packages on the carrier partition. Each service brand may access the carrier partition to install updates to their service brand packages. Additionally, each service brand may permit access to a third party vendor to install vendor packages (e.g. applications) and/or vendor package updates (e.g. application updates) compatible with their own service brand package.

In an embodiment, the carrier partition rules may comprise protecting data stored on the carrier partition. In an embodiment, the carrier partition rules may be enforced or applied by the operating system. For example, the operating system may enforce carrier partition rules protecting data stored on the carrier partition, wherein protecting data (e.g. a service brand package) comprises protecting data from deletion during a reset of the mobile device to factory settings. The carrier partition rules may also permit a service brand and/or the manufacturer to selectively protect data and/or data packages from deletion during a reset of the mobile device. For example, logic instructions may be installed on the carrier partition for each service brand package. Flags may be installed with the logic instructions to switch each service brand package on or off. The carrier partition may be configured to protect the logic instructions from deletion during a reset of the mobile device, but may not be configured to protect the flags. Furthermore, the carrier partition may also be configured to protect service brand packages and vendor packages from deletion during a reset of the mobile device. Additionally, in an embodiment, the carrier partition rules may comprise regulation of the size (i.e. the memory capacity) of the carrier partition. For example, the size of the carrier partition may be a fixed size, such as a size predetermined by the manufacturer. Conversely, the size of the carrier partition may be varied depending on the total available memory space on the mobile device. The carrier partition is sized to store two or more service brand packages. Generally, the carrier partition rules are less restrictive than the system partition rules.

In an embodiment, the mobile device may comprise two or more carrier memory partitions, wherein each of the carrier memory partitions is designated for a particular service brand package. For example, a first service brand package may be stored on a first carrier memory partition and a second service brand package may be stored on a second carrier memory partition. The first carrier memory partition may protect the first service brand package from deletion during a mobile device reset and allow the first service brand to control access to the first carrier memory partition. Additionally, the second carrier memory partition may protect the second service brand package from deletion during a mobile device reset and allow the second service brand to control access to the second carrier memory partition.

In an embodiment, the one or more carrier memory partitions may comprise one or more sub-partitions. For example, a carrier memory partition storing a first service brand package may have one or more sub-partitions which the first service brand package may designated to one or more other data packages and/or one or more vendors providing applications packages. The sub-partition may protect data packages and/or data package updates from a deletion during a mobile device reset, for example. The first service brand may also allow designated data packages and/or designated to vendors access to one or more sub-partitions to install new data packages and/or data package updates.

In an embodiment, a user partition may be provided and installed, for example, by the manufacturer of a mobile device. The user partition may comprise a set of user partition rules. In an embodiment, the user partition rules may comprise requirements for accessing the user partition. For example, access to the user partition may be provided to virtually anyone who desires to download data on to the mobile device.

At block 204, an operating system package may be provided and install on the system partition of the mobile device. The operating system package may be configured to provide the basic factory operating functions for the mobile device.

The rules governing the system partition may be used to protect the operating system for deletion from a mobile device reset and/or restrict access to the operating system.

At block 206, at least a first service brand package employed by a first service brand and a second service brand package employed by a second service brand may be protected from deletion by a mobile device reset. The first service brand package and the second service brand package may be protected from deletion by a mobile device reset by being installed on the carrier partition of the mobile device. In an embodiment, the manufacturer of the mobile device may be instructed, for example by a specification, to install a first service brand package employed by a first service brand on the carrier partition of the mobile device. The first service brand package may be configured to provision the mobile device to a first service brand network. A second service brand package employed by a second service brand may be installed on a carrier partition of the mobile device. In an embodiment, the manufacturer may be optionally instructed, for example by a specification, to install the second service brand package employed by a second service brand on a carrier partition of the mobile device. In an embodiment, the second service brand package may be installed on the same carrier partition as the first service brand package. Conversely, the first service brand package may installed a carrier partition dedicated the first service brand package while the second service brand package may be installed on a different carrier partition, for example a carrier partition dedicated for the second service brand package, than the first service brand package. The second service brand package is configured to provision the mobile device to a second service brand network. In an embodiment, the first service brand and the second service brand may be different brands. Furthermore, in an embodiment, the first service brand network and the second service brand network may be different networks. Conversely, the first service brand and the second service brand may be the same brand, but the first service brand may employ a first service brand package which provisions a mobile device to a first service brand network and the second service brand may employ a second service brand package which provisions a mobile device to second service brand network, wherein the first service brand network and the second service brand network are different networks. For example, Brand A may provide a first service brand employing a first service brand package as well as a second service brand employing a second service brand package, wherein the first service brand package provisions a mobile device to a first service brand network which, for example, operates in a first area, and the second service brand package provisions a mobile device to a second service brand network which, for example, operates in a second and different area. Furthermore, the first service brand and the second service brand may be different brands, but the first service brand network and the second service brand network may be the same network. For example, a first prepaid phone service and a second prepaid phone service may be different service brands, and thus, for example may have different rate packages, but the first and second prepaid phone services may be provisioned on the same prepaid mobile device network.

In an embodiment, a third, fourth, and/or fifth service brand package may be installed on a carrier partition of the mobile device. In an embodiment, the manufacturer of the mobile device may be instructed to install a third, fourth, and/or fifth service brand package employed by a third, fourth, and/or fifth service brand. One of ordinary skill in the art will appreciate after reading this disclosure the quantity of additional service brand packages which may be installed on the carrier partition of the mobile device.

Additionally, in an embodiment, logic instructions may be installed on the carrier partition of the mobile device, wherein the logic instruction comprise flags assigned to each of the service brand packages. In an embodiment, the manufacturer of the mobile device may be instructed to install logic instructions on the carrier partition of the mobile device. In an embodiment, the flags may be modulated in response to receiving a signal, for example, a wireless signal, enabling the first service brand package to transmit a signal to the first server. In an embodiment, only one set of flags (e.g. comprising one or more flags) assigned to one service brand package may be enabled at any one time.

At block 208, the mobile device is provisioned with the first service brand network associated with first service brand package stored on the carrier partition. For example, a first, second, and third service brand package may be stored on the carrier partition of the mobile device, wherein each service brand package is associated with a different service brand network. The mobile device may be provisioned with one service brand network, for example the first service brand network, by activating the first service brand package employed by the first service brand associated with the first service brand network. In an embodiment, activating a service brand package may comprise transmitting an activation signal to the mobile device through a short range wireless signal, an infrared signal, wire line, USB port, or the like. One of ordinary skill in the art will appreciate after reading this disclosure the various embodiments by which an activation signal may be transmitted to a mobile device. In an embodiment, activating the mobile device may comprise permitting a distributor and/or retailer to install pre-set logic instructions on the carrier partition which activates a particular service brand package and directs that particular service brand package to request provisioning data. In an embodiment, the activation signal may modulate one or more logic instruction switches associated with the first service brand package to activate the first service brand package and direct the first service brand package to request provisioning data. In an embodiment provisioning the mobile device with first service brand network may comprise sending a request to a server by the activated service brand package requesting provisioning data. The mobile device may then receive, install, and/or protect the provisioning data with the associated service brand package from the associated carrier server. Once provisioning data is installed with the particular service brand package, the mobile device may then operate on the particular service brand network.

Regardless of how the mobile device may be provisioned on a service brand network, the mobile device may be provisioned on only one service brand network at any one time. Thus, for example, if a mobile device is provisioned on the first service brand network, then the mobile device may not also be provisioned on the second service brand network while the mobile device is provisioned on the first service brand network. Furthermore, if the mobile device is to be moved from a first service brand network to a second service brand network, the mobile device may require removal from the first service brand network before being provisioned on the second service brand network.

At block 210, the mobile device is reset, wherein resetting the mobile device comprises removing the mobile device from the first service brand network (thus, the mobile device is no longer a branded mobile device with the first service brand, but a generic mobile device not branded with any brand). A reset of the mobile device may be performed by installing a code into the mobile device. For example, a reset of the mobile device may be performed by installing a "##RTN" code into the mobile device. A reset of the mobile device may also be performed by sending a signal to the mobile device. One of ordinary skill in the art will appreciate after reading this disclosure the various embodiments by which resetting a mobile device may be carried out.

In an embodiment, removing the mobile device from the first service brand network may comprise deactivating the first service brand package on the carrier partition of the mobile device by deleting data stored on the carrier partition, but unprotected by the carrier partition. For example, carrier partition rules may protect a first service brand package and a second service brand from deletion during a reset of the mobile device. Additionally, in an embodiment, carrier partition rules may protect provisioning data received from the first carrier server. Carrier partition rules may not protect pre-set logic instructions stored on the carrier partition of the mobile device activating the first service brand package. Thus, removing the mobile device from the first service brand network may comprise deleting the pre-set logic instructions on the carrier partition thereby deactivating the first service brand package on the carrier partition of the mobile device.

In an embodiment, removing the mobile device from the first service brand network may comprise deactivating the first service brand package on the carrier partition of the mobile device by modulating flags with the logic instructions assigned to each service brand package, wherein the flags may be switched on or off to activate or deactivate the service brand packages. For example, carrier partition rules may protect a first service brand package, a second service brand, and logic instructions from deletion during a reset of the mobile device. However, carrier partition rules may allow the flags to modulate into the off position during a reset of the mobile device deactivating any activated service brand packages on the carrier partition. Thus, in an embodiment, removing the mobile device from the first service brand network may comprise modulating one or more flags from the "on" position to the "off" position deactivating first service brand package.

In an embodiment, resetting the mobile device may comprise deleting data stored on a user partition of the mobile device and/or unprotected by the carrier partition. For example, video files and/or vendor packages stored on the user partition may be deleted during a reset of the mobile device, thereby losing any data previously installed and/or updated on the user partition when the device is provisioned again with another service brand network.

At block 212, the mobile device is provisioned with the second service brand network without re-installing previously installed data associated with the second service brand package. In an embodiment, the mobile device may be provisioned with second service brand network by activating the second service brand package employed by the second service brand. In an embodiment, activating the second service brand package may comprise transmitting an activation signal to the mobile device through a short range wireless signal, an infrared signal, wire line, USB port, or the like. One of ordinary skill in the art will appreciate after reading this disclosure the various embodiments by which an activation signal may be transmitted to a mobile device. For example, the activation signal may modulate one or more logic instruction switches associated with the second service brand package to activate the second service brand package and direct the second service brand package to request provisioning data. In an embodiment, activating the mobile device may comprise permitting a distributor and/or retailer to install pre-set logic instructions on the carrier partition which activates a particular service brand package and directs that particular service brand package to request provisioning data. In an embodiment provisioning the mobile device with the second service brand network may comprise that the activated second service brand package sends a request to the second carrier server for provisioning data. The mobile device may then receive and install the provisioning data with the second service brand package from the second carrier server. Once provisioning data is installed with the second service brand package, the mobile device may be provisioned with the second service brand network.

In an embodiment, because the first service brand package (i.e. with all of the first service brand updates) is still stored in the carrier partition while the mobile device is provisioned on the second service brand network, another reset of the mobile device may be carried out and the mobile device may again be provisioned on the first service brand network without downloading the first service brand package. In this embodiment, the carrier partition rules may protect the provisioning data installed with the first service brand package during the reset of the mobile device. Therefore, reactivation of the mobile device with the first service brand network does not require the re-installation of provisioning data associated with the first service brand package. Additionally, a manufacturer may have been instructed to install a third service brand package on the carrier partition of the mobile device when the first and second service brand packages were installed. In this case, another reset of the mobile device may be carried out so that the mobile device is provisioned on a third service brand network. It should be understood, that because the first, second, and third service brand packages are stored on the carrier partition, the carrier partition rules may allow updates to each of the packages to be retained after each reset of the mobile device regardless of whether the package was provisioning the mobile device during the update.

Furthermore, if vendors are permitted access to the carrier partition to install and/or update vendor packages on the mobile device, it should be understood that the carrier partition rules may allow installations and/or updates to the vendor packages installed on the carrier partition to be retained after each reset of the mobile device regardless of whether the vendor package was associated with a service brand package provisioning the mobile device during the installation and/or update.

In an embodiment, the method may further comprise installing and/or protecting a service brand package update on the carrier partition with one or more service brand packages while the mobile device is provisioned on a service brand network. For example, first service brand package updates may be installed and/or protected on the carrier partition which increase data rates with the service brand network or install new first service brand package features for the mobile device. One of ordinary skill in the art will appreciate the various types of updates which may be installed and/or protected with a service brand package.

A service brand package update for a particular service brand package may be installed on the carrier partition and/or protected by the carrier partition while the mobile device is provisioned on the service brand network associated with the service brand package update. For example, a service brand package update for a first service brand package may be installed on the carrier partition while the mobile device is provisioned on the first service brand network. A service brand package update for a particular service brand package may be installed on the carrier partition while the mobile device is provisioned on the service brand network unassociated with the service brand package update. For example, a service brand package update for a second service brand package may be installed on the carrier partition and protected by the carrier partition while the mobile device is provisioned on the first service brand network.

In an embodiment, service brand package updates may be installed without obtaining permission from a third party such as a manufacturer or another service brand. For example, a first service brand package update may be required for the first service brand package stored on the carrier partition. Because the first service brand package is stored on the carrier partition, the carrier partition rules may give the first service brand control over access to the carrier partition to update the first service brand package. Thus, the first service brand does not have to obtain permission from a manufacturer to install the first service brand package update. Additionally, because of the carrier partition rules, the first service brand would not have to obtain permission from a second service brand, for example, which also has a service brand package (i.e. second service brand package) stored on the carrier partition. In this example, even though the second service brand also controls access to the carrier partition, the first service brand would not have to obtain permission from the second service brand to access the carrier partition, unless the first service brand sought to access the area of the carrier partition storing data associated with the second service brand. Thus, in an embodiment, carrier partition rules may comprise that a service brand package only controls access to one more sections of the carrier partition where the service brand's data is stored.

In an embodiment, the method may further comprise that one or more service brands storing service brand package(s) on the carrier partition of the mobile device permit a vendor to install and/or update a vendor package on the carrier partition while the mobile device is provisioned on a service brand network. In an embodiment, a vendor package may comprise a data package which is not installed or created by the manufacturer of the mobile device and/or is not created by a service brand storing a service brand package on the mobile device. For example, vendor packages may be installed on the carrier partition for gaming applications, navigating applications, news outlet applications, or the like. One of ordinary skill in the art will appreciate the various types of vendor packages which may be installed and/or updated on the carrier partition.

A service brand with a service brand package stored on the carrier partition may permit a vendor to install and/or update a vendor package on the carrier partition while the mobile device is provisioned on the service brand network associated with the service brand granting permission. For example, a first service brand storing a first service brand package on the carrier partition may permit a vendor to install and/or update a vendor package on the carrier partition while the mobile device is provisioned on the first service brand network. A service brand with a service brand package stored on the carrier partition may also permit a vendor to install and/or update a vendor package on the carrier partition while the mobile device is provisioned on a service brand network not associated with the service brand granting permission. For example, a second service brand storing a second service brand package may permit a vendor to install and/or update a vendor package on the carrier partition while the mobile device is provisioned on the first service brand network.

In an embodiment, the service brand may permit a vendor package to be installed and/or updated based on one or more vendor identifications. A service brand with a service brand package stored on the carrier partition may permit all vendor packages from a particular vendor to install and/or update vendor packages on the carrier partition. For example, a first service brand may permit all vendor packages from vendor "A" to be installed and/or updated on the carrier partition. Additionally, a service brand with a service brand package stored on the carrier partition may permit only approved vendor packages from one or more vendors to install and/or update vendor packages on the carrier partition. For example, a first service brand may permit only gaming vendor packages from one or more vendors to be installed and/or updated on the carrier partition.

In an embodiment, a service brand may permit a vendor to access the carrier partition to install and/or update vendor packages without obtaining permission from a third party such as a manufacturer or another service brand. Because of the carrier partition rules, a service brand may not have to obtain permission from another service brand which also has a service brand package stored on the carrier partition to permit a vendor to access to the carrier partition to install and/or update a vendor package. For example, a first service brand may permit vendor "A" to access the carrier partition to install and/or update vendor "A's" vendor package on the carrier partition, even though a second service brand does not permit vendor "A" to access the carrier partition. In this example, even though the second service brand also controls access to the carrier partition, the first service brand may not have to obtain permission from the second service brand to permit Vendor "A" to access the carrier partition to install and/or update the package of vendor "A", unless the first service brand sought to permit vendor "A" access to the area of the carrier partition storing data associated with the second service brand. Similarly, because of the carrier partition rules, a service brand may not have to obtain permission from the manufacturer to permit a vendor access to the carrier partition to install and/or update vendor packages.

Figure 3:
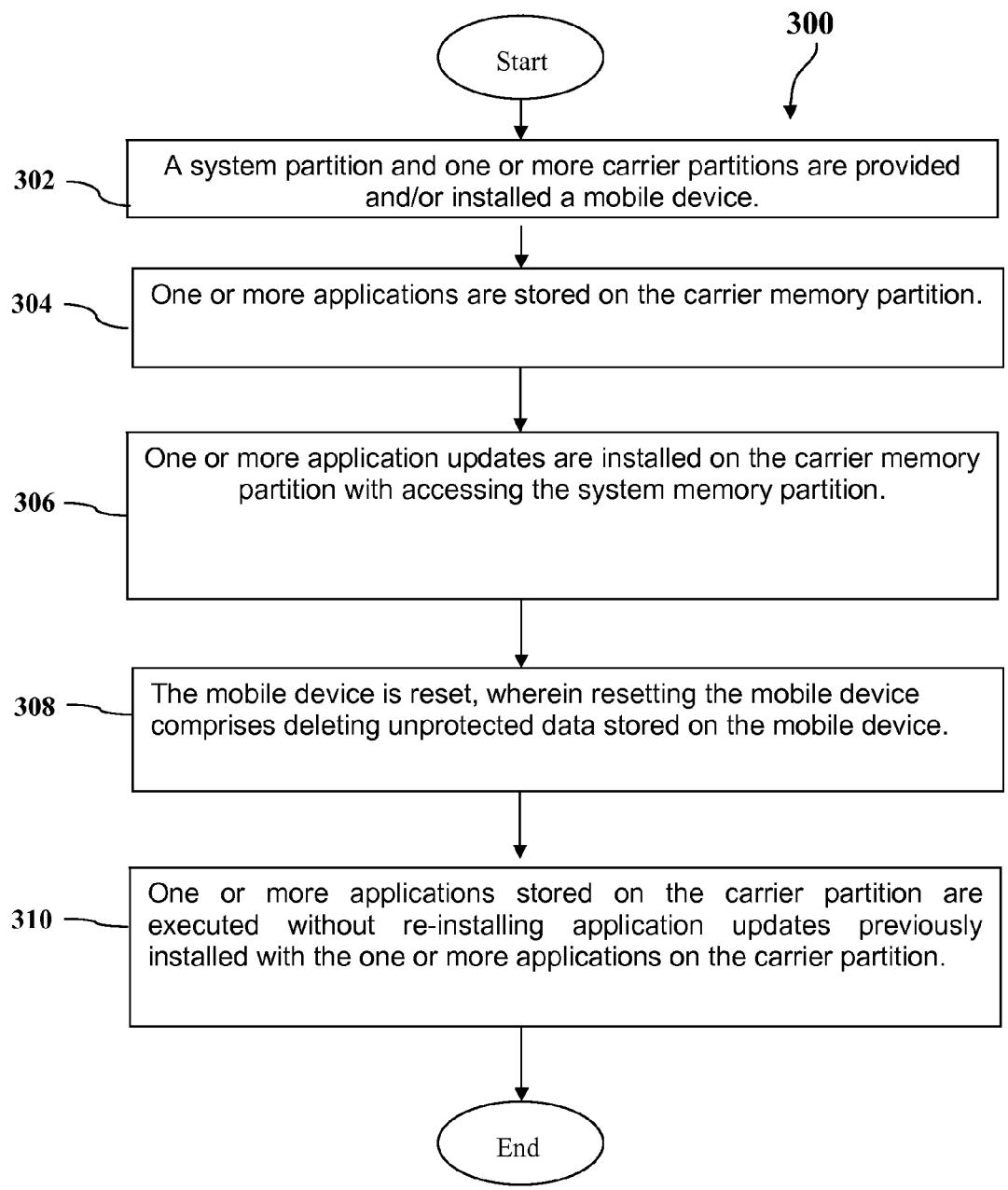
FIG. 3 is a flow chart of a method according to an embodiment of the disclosure.

Turning now to FIG. 3, a method 300 is described. At block 302, a system memory partition and a carrier memory partition may be provided on the mobile device, wherein the carrier memory partition is a partitioned segment of a mobile device operating system with a set of carrier memory partition rules comprising immunity from deletion of data stored on the carrier memory partition during a mobile device reset. The system partition may comprise an operating system package, while the one or more carrier partitions may comprise two or more service brand packages. The service brand packages may be employed by different brands (e.g. a first service brand and a second service brand). In an embodiment, the first service brand package employed by the first service brand may be activated on the mobile device, while the second service brand package employed by the second service brand may be not be activated.

At block 304, one or more applications and/or data packages are stored on the carrier memory partition, wherein the applications and/or data packages are configured to execute one or more functions on the mobile device. In an embodiment, storing one or more applications and/or data packages on the mobile device may comprise protecting one or more applications from deletion during a mobile device reset. For example, a text messaging application may be stored on the carrier memory partition of the mobile device. The mobile device may be reset, thereby deleting all unprotected data packages on the mobile device. The mobile device may still retain the text message application because it was stored on the carrier memory partition protecting the text messaging application from the mobile device reset.

At block 306, one or more application updates and/or data package updates may be installed and/or stored on the carrier memory partition of the mobile device. In an embodiment, because access to the carrier memory partition is controlled by one or more service brands the one or more application updates and/or data package updates may be installed without accessing the system partition. For example, the text messaging application may require updates to accommodate new picture and/or video software which may be sent via text message. These updates may be installed on the carrier memory partition of the mobile device with the permission of one or more service brands. Because the service brands control access to the carrier memory partition, the vendor supplying the text message application and/or the text messaging application updates does not have to coordinate with a manufacturer, for example, in order install applications and/or updates on the mobile device.

At block 308, the mobile device is reset. A mobile device reset comprises deleting unprotected data, such as application packages and/or application package updates, stored on the mobile device. For example, data packages, application packages, updates for data packages, and/or updates for applications packages may be stored on a user memory partition of the mobile device. Thus, when a mobile device reset is executed, all the data packages, application packages, updates for data packages, and/or updates for applications packages stored on the user memory partition may be deleted. Conversely, if the same data packages, application packages, updates for data packages, and/or updates for applications packages are stored on the carrier memory partition for example, they may not be deleted by a mobile device reset.

At block 310, one or more applications stored on the carrier memory partition are executed without re-installing application updates previously installed with the one or more applications on the carrier memory partition. For example, the one or more updates to the text message application may have been installed and/or stored on the carrier memory partition before the mobile device was reset. Because the one or more updates where installed and/or stored on the carrier memory partition before the mobile device reset, the updates previously installed may not require re-installing after the mobile device reset to execute the updates and/or the applications with the updates. Conversely, if the one or more applications were stored on, for example, the user memory partition, the one or more updates may require re-installation after the mobile device is reset.

Figure 4:
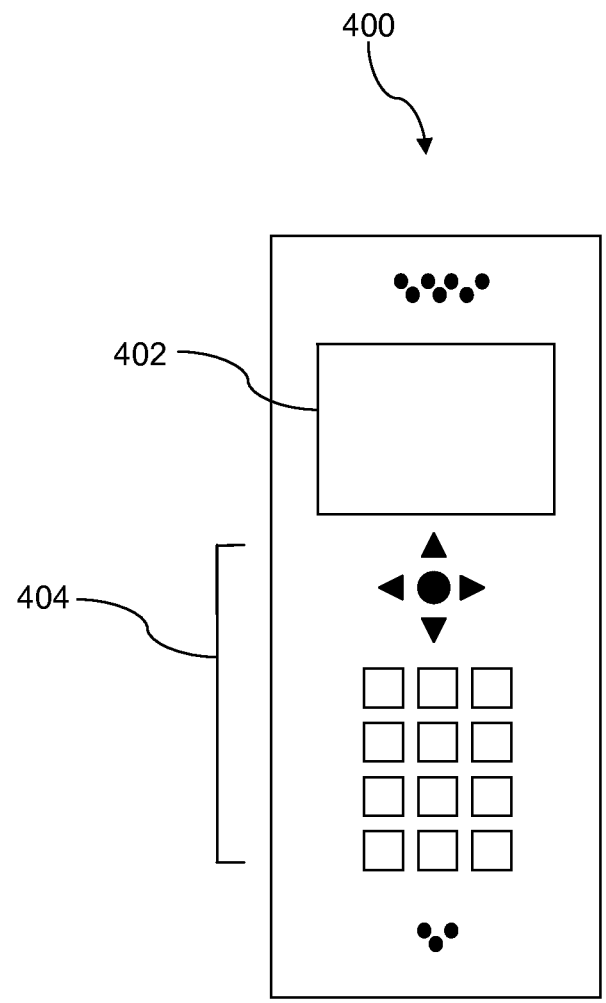
FIG. 4 is an illustration of a mobile device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
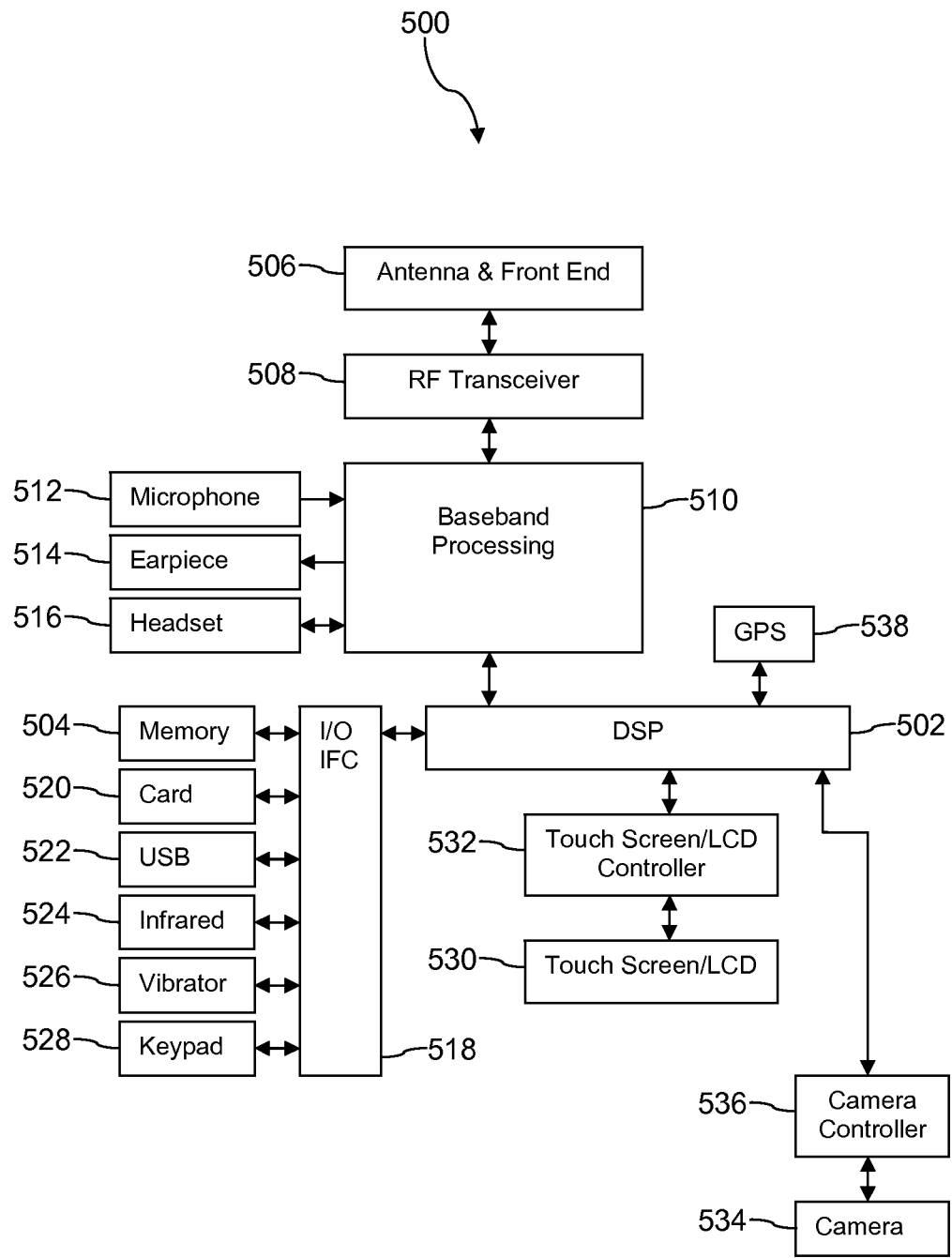
FIG. 5 is a block diagram of a mobile device according to an embodiment of the disclosure.

FIG. 5 shows a block diagram of the mobile device 500. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
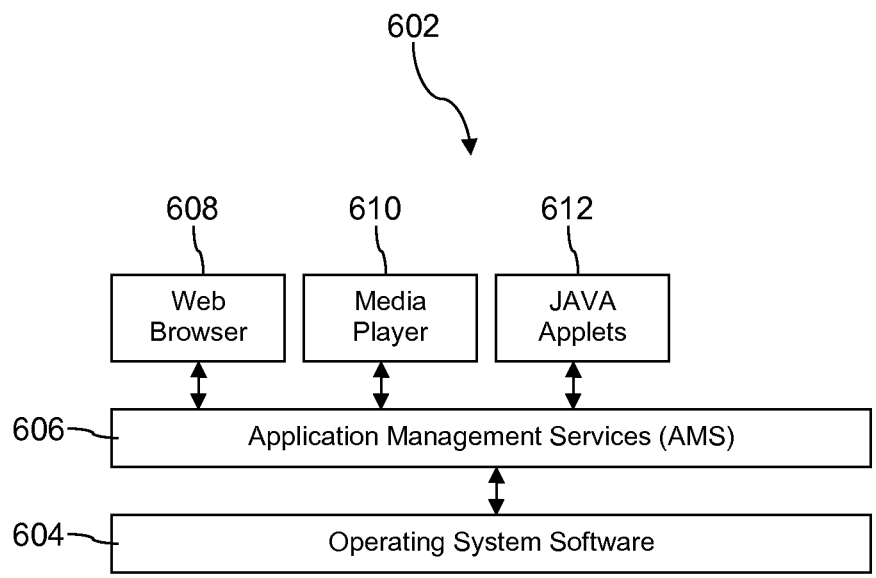
FIGS. 6A and 6B are block diagrams of software architecture for a mobile device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
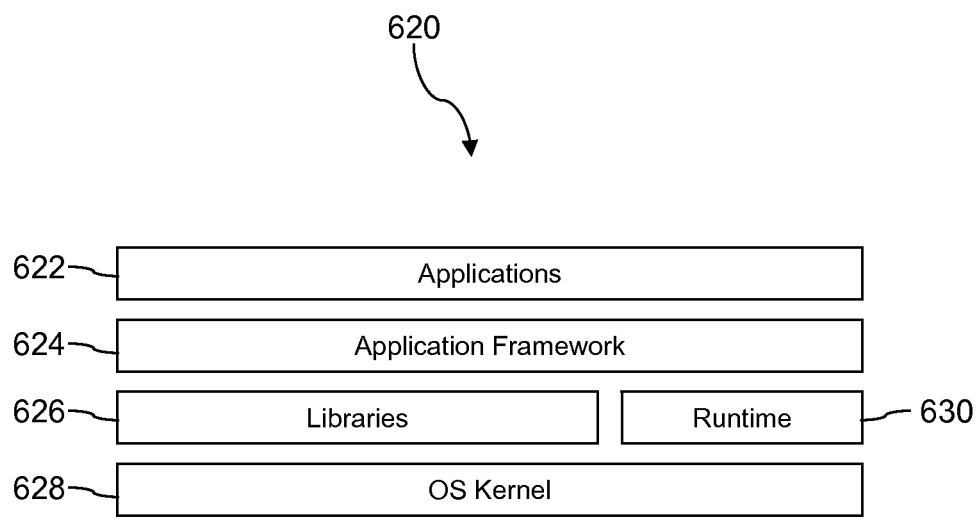

FIG. 6B illustrates an alternative software environment 620 that may be implemented by the DSP 502. The DSP 502 executes operating system software 628 (for example an operating system kernel) and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
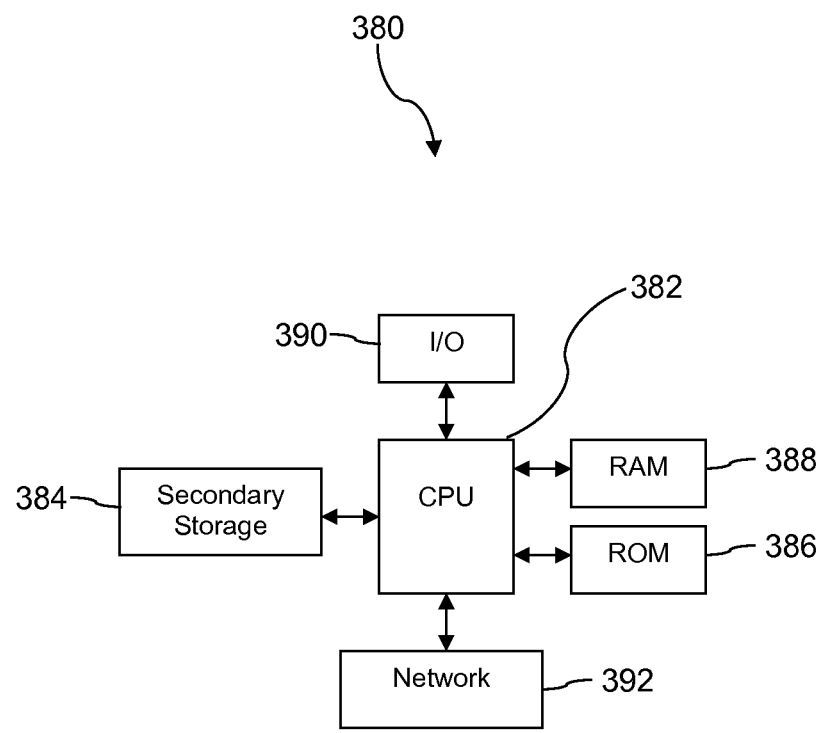
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of branding a mobile device, comprising:
providing a system memory partition and a carrier memory partition on the mobile device, wherein the carrier memory partition includes a partitioned segment of a mobile device operating system with a set of carrier memory partition rules comprising immunity, during a mobile device reset, from deletion of data stored on the carrier memory partition, and wherein the data of the carrier memory partition comprises two or more service brand packages;
protecting the two or more service brand packages from deletion responsive to the mobile device reset, wherein the two or more service brand packages are employed by service brands and are configured to provision the mobile device with one or more networks, and wherein protecting the two or more service brand packages comprises storing the two or more service brand packages on the carrier memory partition and providing control of access to the carrier memory partition to a carrier associated with one of the two or more service brand packages;
provisioning the mobile device with a first service brand network, wherein provisioning the mobile device with the first service brand network comprises activating the first service brand package and receiving mobile service on the mobile device using the first service brand network;

resetting the mobile device, wherein resetting the mobile device comprises removing the mobile device from the first service brand network, deleting unprotected data stored on the mobile device, and immunizing the carrier memory partition from deletion of data by providing the control of access to the carrier memory partition to the carrier associated with one of the two or more service brand packages; and provisioning the mobile device with a second service brand network without re-installing previously installed data associated with the second service brand package from the carrier memory partition, wherein provisioning the mobile device with the second service brand network comprises activating the second service brand package from the carrier memory partition and receiving mobile service on the mobile device using the second service brand network, and wherein the first and second service brand networks comprise the same network or different networks.

2. The method of claim 1, wherein provisioning comprises accessing a service brand package stored on the carrier memory partition without accessing the system memory partition.

3. The method of claim 1, wherein the system memory partition comprises a partitioned segment of the mobile device operating system distinct from the carrier partition and a set of system memory partition rules.

4. The method of claim 3, wherein the set of system partition rules comprise providing control over access to the system memory partition to the manufacturer of the mobile device.

5. The method of claim 1, the method further comprising providing a user memory partition on the mobile device, wherein the user memory partition is governed by a set of user memory partition rules.

6. The method of claim 1, wherein the set of carrier memory partition rules comprise providing control over access to the carrier partition to the one or more carriers with service brand packages stored on the carrier memory partition.

7. The method of claim 1, the method further comprising updating the first service brand package on the carrier memory partition while the mobile device is provisioned on the first service brand network, wherein updates on the carrier memory partition are installed independently of any other updates.

8. The method of claim 1, the method further comprising installing logic instructions comprising flags on the carrier memory partition, wherein the flags are modulated to activate the first service brand package.

9. The method of claim 1, wherein the carrier memory partition rules further comprise permitting a vendor to access the carrier memory partition to install vendor packages on the carrier memory partition.

10. The method of claim 1, wherein the carrier memory partition rules further comprise permitting a vendor to access the carrier memory partition to install vendor package updates to vendor packages on the carrier memory partition.

11. A method of branding a mobile device, comprising:
providing a system memory partition and a carrier memory partition on the mobile device, wherein the carrier memory partition includes a partitioned segment of a mobile device operating system with a set of carrier memory partition rules comprising immunity, during a mobile device reset, from deletion of data stored on the carrier memory partition, and wherein the data of the carrier memory partition comprises two or more service brand packages;

storing one or more applications on the carrier memory partition, wherein applications are configured to execute one or more functions on the mobile device, and wherein storing the one or more applications comprises protecting the one or more applications from deletion during the mobile device reset by providing control of access to the carrier memory partition to a carrier associated with one of a plurality of service brand packages of the carrier memory partition;

installing one or more applications updates on the carrier memory partition without accessing the system memory partition;

resetting the mobile device, wherein resetting the mobile device comprises deleting unprotected data stored on the mobile device and immunizing the carrier memory partition from deletion of data by providing the control of access to the carrier memory partition to the carrier associated with one of the plurality of service brand packages; and executing the one or more applications stored on the carrier partition without re-installing application updates previously installed with the one or more applications on the carrier partition.

12. The method of claim 11, wherein the system memory partition comprises a set of system memory partition access rules different from the carrier memory partition rules and an operating system package.

13. The method of claim 11, wherein resetting the mobile device further comprises deactivating a first service brand package on the carrier memory partition without deleting provisioning data installed with the first service brand package.

14. The method of claim 11, wherein installing the one or more application updates comprises installing application updates associated with at least an activated service brand package.

15. The method of claim 11, wherein installing the one or more application updates comprises installing application updates associated with at least a deactivated service brand package.

16. The method of claim 11, wherein resetting the mobile device comprises protecting data stored on at least the carrier memory partition that is at least associated with a previously activated service brand package or at least a previously deactivated service brand package.

17. A mobile device, comprising:
a radio transceiver that communicatively couples with a wireless network of a carrier;
an at least one processor;
a mobile device operating system;
a carrier memory partition comprising a set of carrier partition rules, wherein the carrier memory partition rules:
provide control of access to the carrier partition to the carrier associated with at least one of a plurality of service brand packages stored on the carrier memory partition,
immunize the carrier memory partition from deletion of data by providing the control of access to the carrier memory partition to the carrier, and
protect at least a first service brand package and a second service brand package of the plurality of service brand packages stored on the carrier memory partition during a reset of the mobile device; and a system memory partition comprising a set of system memory partition rules, wherein the system memory partition rules:
> provide control over access to the system partition to the manufacturer of the mobile device, and
> provide data stored on the system memory partition that is unprotected from deletion during the reset of the mobile device.

18. The apparatus of claim 17, wherein the mobile device comprises two or more carrier memory partitions, wherein each of the carrier memory partitions is designated for a particular service brand package.

19. The apparatus of claim 18, wherein the two or more carrier memory partitions comprise at least a first carrier memory partition and a second carrier memory partition, wherein the first carrier memory partition protects the first service brand package and access to the first carrier memory partition is controlled by the first service brand and the second carrier memory partition protects the second service brand package and access to the second carrier memory partition is controlled by the second service brand.

20. The apparatus of claim 17, wherein the carrier memory partition further comprises one or more sub-partitions.

* * * * *